April 3, 1956 N. W. HALSEY 2,740,416
WASHING MACHINE FOR BAKERY PANS
Filed June 24, 1953 3 Sheets-Sheet 1
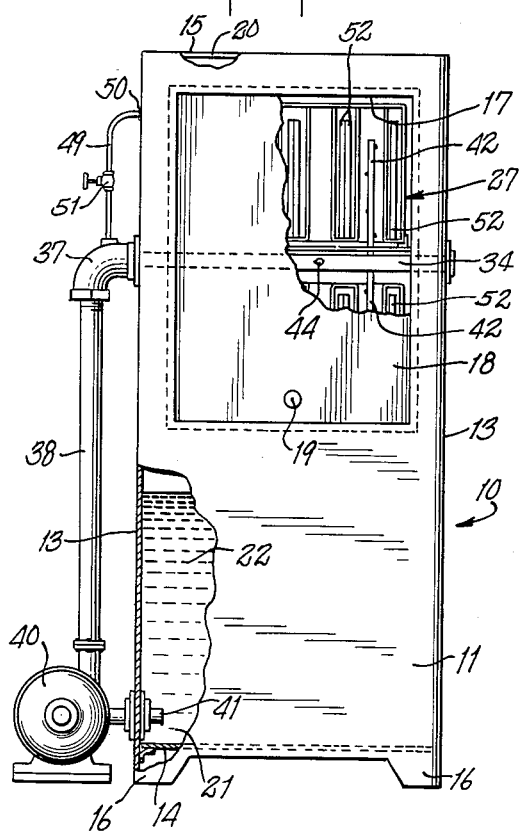
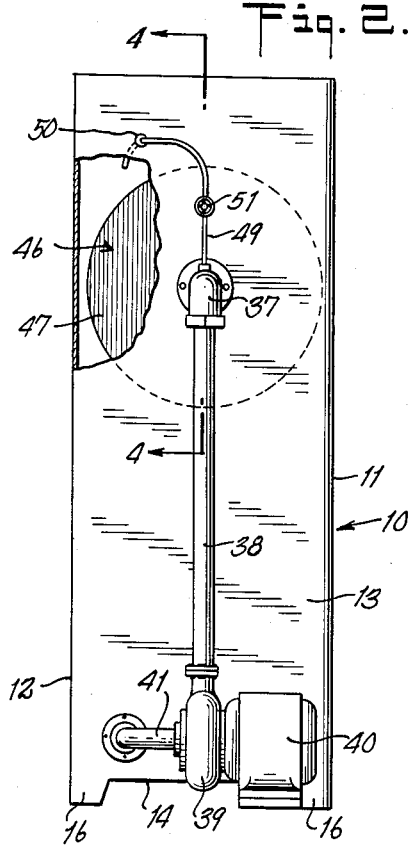
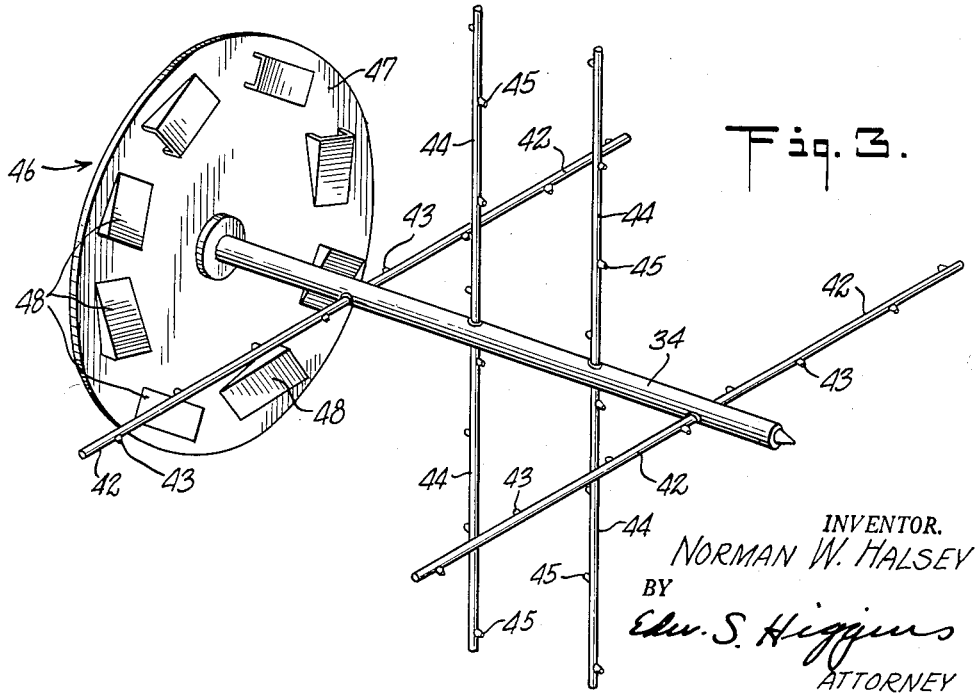
INVENTOR.
NORMAN W. HALSEY
BY
Edw. S. Higgins
ATTORNEY April 3, 1956     N. W. HALSEY     2,740,416
WASHING MACHINE FOR BAKERY PANS
Filed June 24, 1953     3 Sheets-Sheet 2

INVENTOR.
NORMAN W. HALSEY
BY
Edw. S. Higgins
ATTORNEY

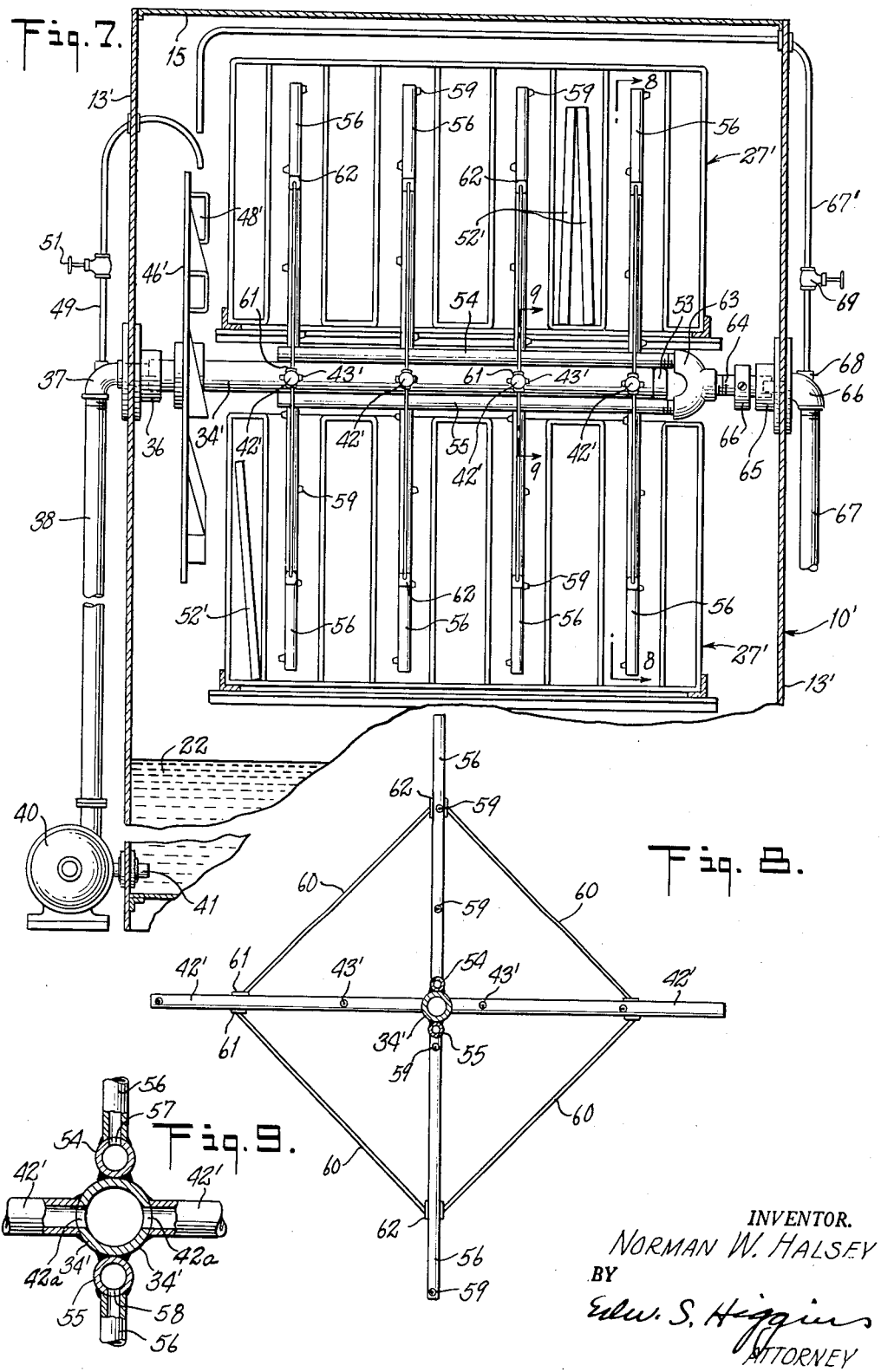

United States Patent Office 2,740,416
Patented Apr. 3, 1956

2,740,416

WASHING MACHINE FOR BAKERY PANS

Norman W. Halsey, Jackson Heights, N. Y.

Application June 24, 1953, Serial No. 363,759

6 Claims. (Cl. 134—99)

This invention relates to washing machines for bakery pans, trays and the like.

In baking operations, where shallow pans are used, it is difficult to remove the incrustation and foreign matter left after the baking operation. In order to remove this incrustation and foreign matter efficiently, the entire surface of the pan must be sprayed with a cleaning solution at high pressure, with the spraying devices close to and movable very slowly over the pan so that a complete coverage of the pan is provided.

For the sake of economy and efficiency, it is also desirable that a large number of pans be cleaned at the same time, in a minimum of space.

A primary object of the present invention is to provide a washing machine for bakery pans and the like in which the spraying nozzles rotate close to the pans.

Another object of the invention is to provide a washing machine of this character in which part of the water that is used as the cleaning agent serves as the propelling agent or source of power by which the spraying devices are rotated.

A further object of the invention is to provide a machine for washing bakery pans in which a gravity water wheel is used for slowly moving the operating parts.

Still another object of the invention is to provide a washing machine for bakery pans in which the pans are vertically disposed in spaced relation and in which the entire spray system is rotated by a water wheel and spraying tubes or pipes revolve between the bakery pans so that a machine of small dimensions with a capacity for cleaning a large number of pans at a time is provided.

Yet another object of the invention is to provide a washing machine for bakery pans in which the pans may be readily inserted into and removed from the machine.

Still anoher object of the invention is to provide a washing machine with a novel rack for supporting the pans in spaced vertical arrangement, which rack can be readily inserted into and removed from the machine.

A still further object of the invention is to provide a washing machine for bakery pans with means for rinsing the pans with fresh hot water after the washing operation.

It is further proposed to produce a washing machine for bakery pans having a revolving spray system which combines both washing and rinsing operations in a single unit.

For a further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Figure 1 is a front elevational view of a washing machine for bakery pans embodying one form of my invention, bakery pans being shown in position therein, and parts being broken away for the sake of clearness.

Figure 2 is a side elevational view thereof, parts being broken away.

Figure 3 is an enlarged perspective view of the spraying system connected to a water wheel.

Figure 7 is a front elevational view, partly diagrammatic, showing a modified form of spraying and rinsing systems.

Figure 8 is a vertical sectional view taken on the plane of the line 8—8 of Figure 7.

Figure 9 is a vertical sectional view taken on the plane of the line 9—9 of Figure 7.

Figure 4:
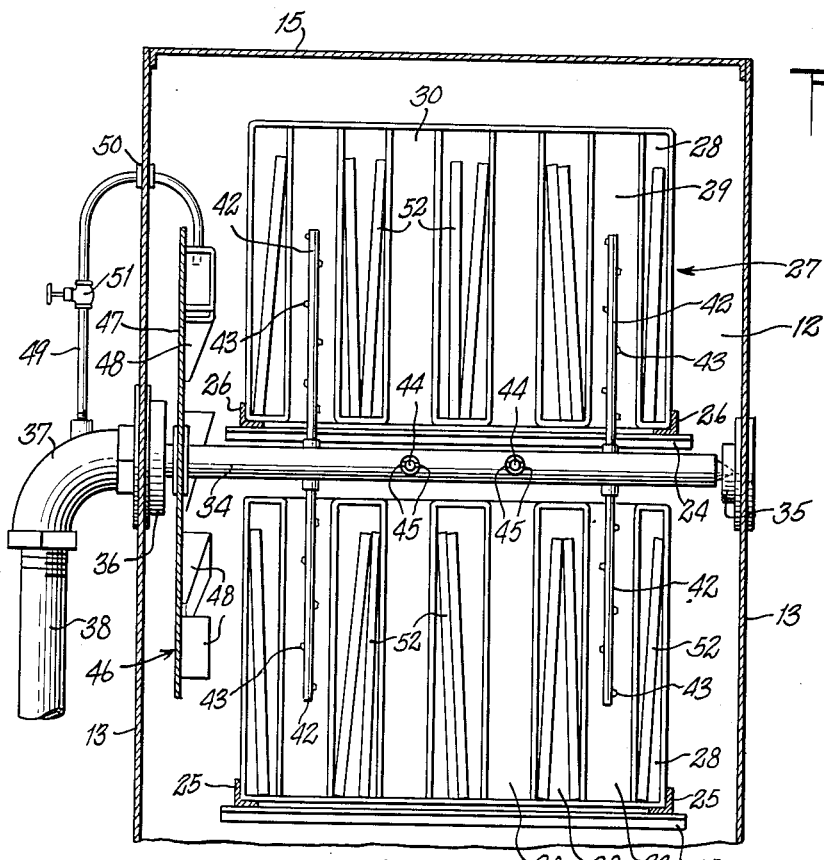
Figure 4 is an enlarged vertical sectional view taken on the plane of the line 4—4 of Figure 2.
Figure 5:
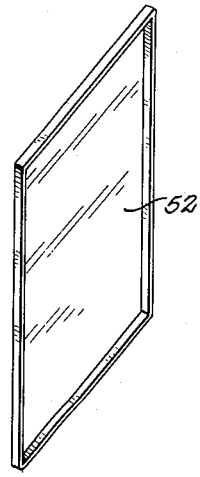
Figure 5 is an enlarged perspective view of a bakery pan.

Referring to Figures 1 to 6, inclusive, showing the first form of the invention, the improved machine is shown as comprising a rectangular-shaped metal casing 10 having a front wall 11, rear wall 12, side walls 13 and bottom wall 14 and top wall 15, the casing being supported on corner legs 16. The upper part of the front wall 11 is open as indicated at 17 and is provided with a sliding door 18, having a handle 19, adapted to be slid upwardly through an elongated slot 20 adjacent the front end of the top wall 15 in order to gain access to the interior of the casing.

The bottom portion of the casing serves as a tank 21 for the cleaning fluid or solution 22 which may be admitted through the opening 17 in the front wall of the casing. Suitable detergent material, such as powdered soap, liquid soap or other suitable detergent material may be placed in the tank or mixed with the fluid in the usual manner.

At about midway its height, the casing 10 is provided with horizontally disposed lower angle bars 23 extending across the front and rear walls 11 and 12 and secured thereto by welding or otherwise. Similar angle bars 24 are secured to the front and rear walls and spaced above the angle bars 23. The lower angle bars 23 support angle bars 25 at their ends, said side bars 25 extending from the front to the rear of the casing and being suitably secured to the bars 23. The upper angle bars 24 also support angle bars 26 at their ends, the side bars 25 and 26 being disposed in vertical alignment and serving as guides.

Figure 6:
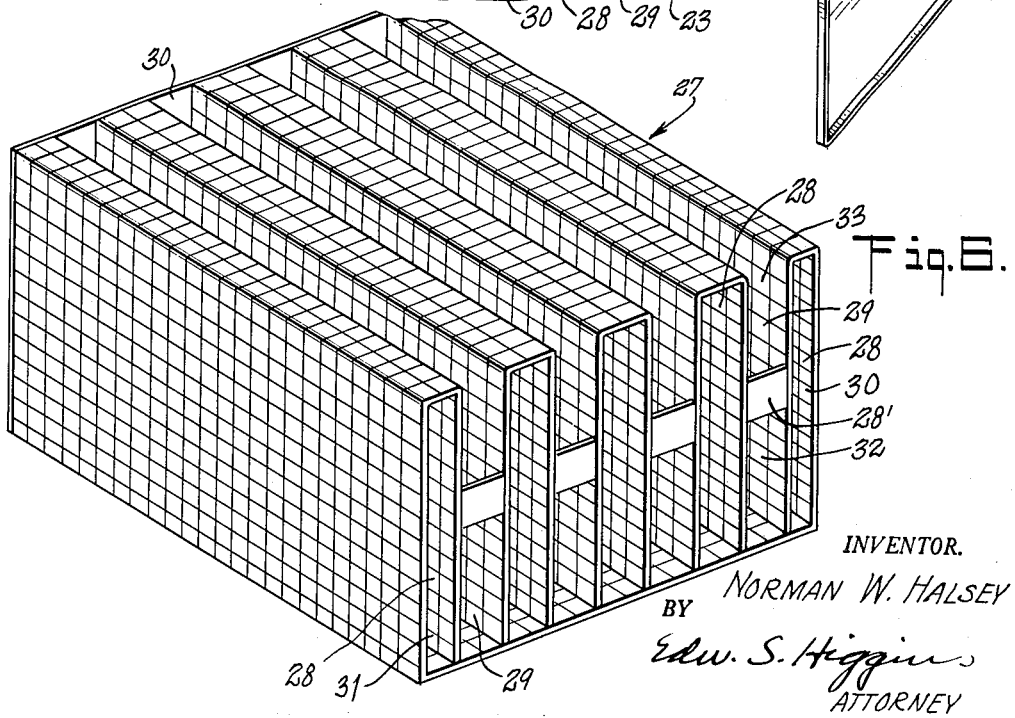
Figure 6 is an enlarged perspective view of a rack for supporting the bakery pans used with the machine.

A rack structure 27, for supporting pans, trays and like articles being cleaned, as shown in detail in Fig. 6, is slidably mounted on each of the lower and upper pairs of angle bars 25 and 26, respectively. Each rack structure 27 consists of a strip of stiff wire mesh shaped to form a plurality of elongated rectangular-shaped narrow alternately arranged compartments 28 and 29. The compartments 28 and 29 are closed at one end by a solid metal wall 30 and at their opposite ends are formed with entrance openings 31 and 32, respectively. Compartments 28 are each bound on all sides with wire mesh material, except the entrance end 31, and the compartments 29 are each bound on only three sides, with one side open as indicated at 33 to provide clearance openings through the margin of the rack structure. The compartments 28 are connected by plates 28' extending across the open compartments 29 midway their depths in order to afford rigidity to the rack structure.

A revolving spray assembly is mounted in the casing 10 above the solution tank 21. This assembly includes a main distribution pipe or header 34 disposed across the casing just below the upper angle bars 24 and journalled in flanged side bearings 35 and 36 on the side walls 13 of the casing. The main distribution header is connected at one end through an elbow 37 to a supply pipe 38 extending downwardly along the adjacent side wall of the casing where it is operatively connected to one side of a pump 39 driven by a motor 40. The other end of the pump is connected to an outlet pipe 41 extending through the bottom end of the adjacent side wall and into the interior of the detergent solution tank. The opposite end of the main distribution header 34 is closed.

Operatively connected to the main distribution pipe or header 34 adjacent each end thereof is a pair of spraying pipes 42 extending radially therefrom in opposed relation and communicating with the interior of the main pipe. Each pipe 42 is provided with spaced outlet spraying nozzles 43 and has its outer free end closed.

Also operatively connected to the main distribution pipe 34 between the end pairs of pipes 42 are pairs of intermediate opposed spraying pipes 44 having spraying nozzles 45. The pairs of pipes 44 radiate from the main pipe at points spaced ninety degrees from the points of connection of the pipes 42 so that the pairs of pipes 42 and 44 are disposed at right angles to each other, as shown in Fig. 3.

A water wheel 46 is secured to the end of the main pipe 34 adjacent its connection with the elbow 37, inside the casing 10. The wheel consists of a disk-shaped body 47, with pockets 48 welded or otherwise secured to one surface of the body and arranged in circular formation adjacent its periphery, the pockets opening outwardly toward the periphery of the disk-shaped body.

A branch pipe 49 leads from the elbow 37 and extends upwardly and through a flanged tubular bearing 50 mounted in an opening in the side wall of the casing and into the interior of the casing where it extends downwardly with its free open end positioned above and in vertical alignment with the pockets 48 of the water wheel. A valve 51 is pipe 49 controls the flow of fluid therethrough.

In using the machine, the water in the tank 21 is properly conditioned with the desired detergent and shallow pans 52 and like articles to be cleaned are slid into the compartments 28 of the rack structure 27 and positioned loosely therein in upright position. The pans are preferably mounted in the rack structure when the rack is detached from the machine. The rack structures 27 with the pans therein are inserted into the machine through the opening 17 in the front wall of the casing and slid into supporting position on the angle bars 25 and 26. The rack structures should be so positioned that the openings or marginal clearances 33 of the compartments 29 thereof are opposed to each other as shown in Fig. 4. This will automatically position the radial spraying pipes or tubes 42 and 44 inside the compartments 29 so that they can rotate without hindrance. In Fig. 4, a single pan 52 is shown positioned in each of the end compartments 28, and two pans, back to back, are shown positioned in each of the other intermediate compartments 28. The inner surface of each pan faces the spraying nozzles of the pipes or tubes 42 and 44.

In operation, the detergent solution 22 in the tank 21 is pumped by means of a pump 39 upwardly through the pipe 38 and into the main distribution header 34 whereby the solution is forced out through the nozzles 43 and 45 of the tubes or pipes 42 and 44, respectively, under pressure and directed against the surfaces of the pans 52 in the compartments 28 of the rack structures. At the same time, a portion of the pumped solution passes through the branch pipe 49 and is controlled by the valve 51 so that it drips out of the pipe 49 and falls by gravity into the pockets 48 of the water wheel 46 thereby turning said wheel and the main header 34 and radial pipes 42 and 44 very slowly so that the jets of cleaning solution will be directed against the entire area of the inner surfaces of the pans at high pressure so as to thereby thoroughly clean and wash said surfaces. The cleaning fluid drops into the lower tank 21 for recirculation through the machine.

The cleaning and rinsing systems shown in Figures 7, 8 and 9 are for use with a large washing machine having a casing 10' and pan supporting rack structure 27' of larger dimensions than the casing 10 and rack structure 27 of the machine of Figure 1. The spraying system for cleaning the pans shown herein differs from the system shown in Figures 1 to 6, inclusive, in that four pairs of radial spraying tubes or pipes 42' with spraying nozzles 43' for cleaning are connected to the main distribution pipe or header 34' by welding or otherwise and communicate with the interior of the main pipe or header through openings 42a. All of the radial tubes or pipes 42' are connected to the header on the same circumferential plane and are not offset as in the case of the radial pipes 42 and 44 of the machine shown in Figures 1 to 6, inclusive. The outer end of the main pipe or header 34' is also closed by a plug 53.

A rinsing system is shown herein and consists of distribution pipes 54 and 55 extending alongside the main pipe or header 34' in opposed relation and are secured thereto by welding or otherwise. Four pairs of opposed spraying and rinsing pipes 56 are connected to the pipes 54 and 55 and communicate therewith through openings 57 and 58, respectively, in said latter pipes. The radial pipes 56 are provided with spraying nozzles 59 in offset relation. Each pipe 56 of a pair is circumferentially offset ninety degrees from its adjacent radial pipe 42'. The radial pipes 42' and 56 are tied together by rods 60 having end bearings 61 and 62 on the radial pipes 42 and 56, respectively.

The ends of the pipes 54 and 55, adjacent the water wheel 46', are closed and the opposite ends thereof are connected to a Y-fitting 63 which in turn is connected to one end of a pipe 64, the other end of pipe 64 being journalled in a flanged tubular bearing 65 supported in an opening in the side wall 13' of the casing 10'. A thrust collar 66 is provided inwardly of the bearing 65. A supply pipe 67 leading from a source of clean, fresh, hot rinsing water (not shown) opens into the pipe 64 inside the tubular bearing 65 by means of a pipe or nipple 66. A branch pipe 67' is connected at one end to the pipe 67 by a connection 68 and extends across to a point above the water wheel 46' and then downwardly with its free end in alignment with the pockets 48' of the water wheel. The flow of water through the branch pipe 67' is controlled by a valve 69.

In this machine, the rinsing water passes from the supply pipe 67 to the pipe 64, Y-fitting 63, the pipes 54 and 55, radial pipes 56, and through the nozzles 59 to the surfaces of the pans 52' in the racks 27'. At the same time, a portion of the rinsing water passes through branch pipe 67', which water is permitted by means of the valve 69 to drip into the pockets 48' for turning the water wheel 46' and the spraying pipes or tubes 42' and 56 slowly.

In all other respects, the machine shown in Figures 7, 8 and 9 is similar to the form of machine shown in Figures 1 to 6, inclusive, and similar reference characters are used to indicate similar parts.

While I have illustrated and described the preferred embodiments of my invention, it is to be understood that I do not limit myself to the precise constructions herein disclosed and the right is reserved to all changes and modifications coming within the scope of the invention as set forth in the appended claims.

Having thus described my invention, what I claim as new and desire to secure by United States Letters Patent is:

1. A washing machine for bakery pans comprising a casing, removable racks supported in said casing in opposed relation, said racks having alternating closed and open compartments in aligned relation, the closed compartments having entrance openings and being adapted to support bakery pans in vertical position, a main liquid distribution header rotatably supported crosswise in the casing, said main header being connected to a source of liquid supply, liquid spraying pipes carried by said main header in radial formation and being disposed in the open compartments of the opposed racks, and a water wheel fastened to one end of said main header and being disposed vertically for intermittent actuation by part of the water from said source of liquid supply for slowly turning the header.

2. A washing machine for bakery pans comprising a casing, removable racks supported in said casing, in opposed relation, said racks having alternating closed and open compartments in aligned relation, the closed compartments having entrance openings and adapted to support bakery pans in vertical position, a main liquid distributing pipe rotatably supported crosswise of the casing, said main pipe being connected to a source of liquid supply, a motor driven pump in the connection between the main pipe and liquid source for forcing liquid through the main pipe, liquid spraying pipes carried by said main pipe in radial formation and disposed in the open compartments of said racks, and a water wheel fastened to one end of said main pipe and being disposed vertically for intermittent actuation by part of the water from said source of liquid supply for slowing turning said main pipe.

3. A washing machine for bakery pans comprising a casing, a tank in said casing containing a detergent solution, removable and slidable racks supported in said casing in opposed relation, said racks having means for supporting bakery pans in vertical position, in spaced relation, a main liquid distribution pipe rotatably supported in the casing and connected to said tank, liquid spraying pipes carried by said main liquid pipe in radial formation and disposed in the spaces between the pans, a water wheel connected to said main pipe and operable by the detergent solution in said tank and being connected to said main pipe for rotating the latter, and means for rinsing the detergent solution off of the pans after cleaning, said means including a pipe connected at one end to a source of rinsing liquid, and spraying pipes inside the casing and in communication with said latter pipe for spraying rinsing liquid onto the pans in the racks.

4. In a washing machine for bakery pans, spraying apparatus including a rotatable main distribution pipe connected to a source of liquid supply, spaced pairs of spraying pipes carried by said main pipe and radially projecting therefrom, means including a water wheel for rotating said main pipe, and rinsing means including pipes arranged alongside and secured to said main pipe in opposed relation, said rinsing pipes being connected to a source of liquid supply, and radial spraying pipes carried by said opposed pipes for spraying rinsing liquid.

5. A washing machine for bakery pans comprising a casing, a tank in said casing containing a detergent solution, removable and slidable racks supported in said casing in opposed relation, said racks having means for supporting bakery pans in vertical position, in spaced relation, a main liquid distribution pipe rotatably supported in the casing and connected to said tank, liquid spraying pipes carried by said main liquid pipe in radial formation and disposed in the spaces between the pans, a water wheel connected to said main pipe and operable by the detergent solution in said tank and being connected to said main pipe for rotating the latter, means for rinsing the detergent solution off of the pans after washing, said means including a pipe connected at one end to a source of rinsing liquid, pipes arranged alongside and secured to the main pipe in opposed relation, means of connection between said opposed pipes and said rinsing liquid supply pipe, and radial spraying pipes carried by said opposed pipes for spraying rinsing liquid on the pans.

6. A washing machine for bakery pans comprising a casing, a tank in said casing containing a detergent solution, removable and slidable racks supported in said casing in opposed relation, said racks having means for supporting bakery pans in vertical position, in spaced relation, a main liquid distribution pipe rotatably supported in the casing and connected to said tank, liquid spraying pipes carried by said main liquid pipe in radial formation and disposed in the spaces between the pans, a water wheel connected to said main pipe and operable by the detergent solution in said tank and being connected to said main pipe for rotating the latter, means for rinsing the detergent solution off of the pans after washing, said means including a pipe connected at one end to a source of rinsing liquid, pipes arranged alongside of and secured to the main pipe in opposed relation, means of connection between the opposed pipes and the pipe connected to the source of rinsing liquid and radial pipes carried by said opposed pipes for spraying rinsing liquid on the pans, and means independent of the detergent solution for rotating said water wheel, said independent means including a pipe connected to the rinsing liquid supply pipe, the free end of said independent pipe being disposed over the water wheel for driving the latter, and means for controlling the flow of liquid through said independent pipe.

References Cited in the file of this patent

UNITED STATES PATENTS

| | | |
|---|---|---|
| 1,386,734 | Rosenbaum | Aug. 9, 1921 |
| 2,051,233 | Webb | Aug. 18, 1936 |
| 2,655,163 | Lyman | Oct. 13, 1953 |

FOREIGN PATENTS

| | | |
|---|---|---|
| 76,302 | Switzerland | Dec. 1, 1917 |